Aug. 10, 1954  R. H. HAGOPIAN  2,685,833
DIELECTRIC HEATING SYSTEM FOR CEREALS AND SIMILAR MATERIALS
Filed Nov. 26, 1949

WITNESSES:

INVENTOR
Richard H. Hagopian.
BY
ATTORNEY

Patented Aug. 10, 1954

2,685,833

UNITED STATES PATENT OFFICE 2,685,833

DIELECTRIC HEATING SYSTEM FOR CEREALS AND SIMILAR MATERIALS

Richard H. Hagopian, Halethorpe, Md., assignor to Westinghouse Electric Corporation, East Pittsburgh, Pa., a corporation of Pennsylvania Application November 26, 1949, Serial No. 129,649

9 Claims. (Cl. 99—253)

1

This invention relates to the dielectric heating of grain materials in the nature of cereals such as rice, wheat and other cereals that receive a preliminary high frequency heat-treatment in their processing prior to further distribution in commerce.

It has been dangerous to use high frequency energy in the preparation of prepared cereals because of the frequent burning and arcing that take place. Such burning and arcing constitute a very serious fire hazard because of the prevailing cereal dust in the ducts which convey the cereal from one operation to another.

I have found that in a system in which a conveyor carries a layer of cereal between a pair of spaced heating-electrodes having high power densities thereacross, burning and arcing can be avoided if the cereal is first packed or tamped on the conveyor so that the top exposed surface of the layer of cereal on the conveyor is fairly smooth and does not have high spots in which the high-frequency current can concentrate, and so that good electrical contact is made between the various grains of cereal in the packed or tamped layer. In accordance with my invention, the compacting or tamping means may take the form of a single plate arranged before the heating-electrodes so as to smooth down and pack the cereal loaded on the conveyor, or it may take a more preferred form of a tamping plate arranged before the heating-electrodes and reciprocated so as to tamp or compact the layer of cereal on the conveyor.

A further object of my invention is to provide a dielectric heating system for heating cereals which is piled up on a conveyor to a depth of several inches or more in order to make a good dielectric load for a tube-oscillator generator which supplies the high-frequency energy for heating the cereal.

Figure 2:
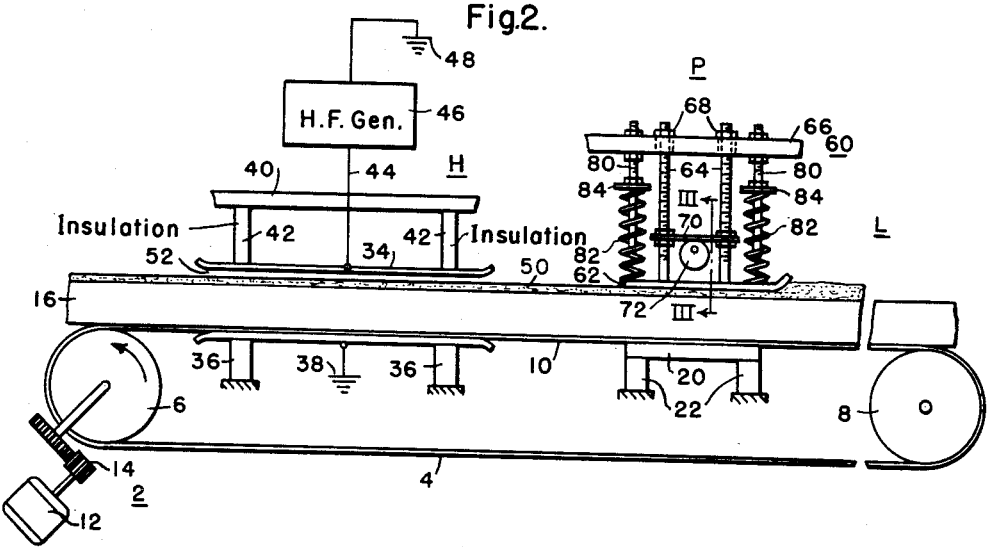
Figure 3:
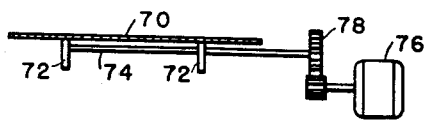

Further objects, features and innovations of my invention will be discernible from the following description of preferred forms thereof to which the invention is not to be limited, except as required by the prior art. The description is to be taken in conjunction with the accompanying simplified drawing, in which Figure 1 is an elevational view of apparatus embodying my invention;

Fig. 2 is an elevational view of a modified form of apparatus embodying my invention; and Fig. 3 is a vertical sectional view substantially on the line III—III of Fig. 2.

Figure 1:
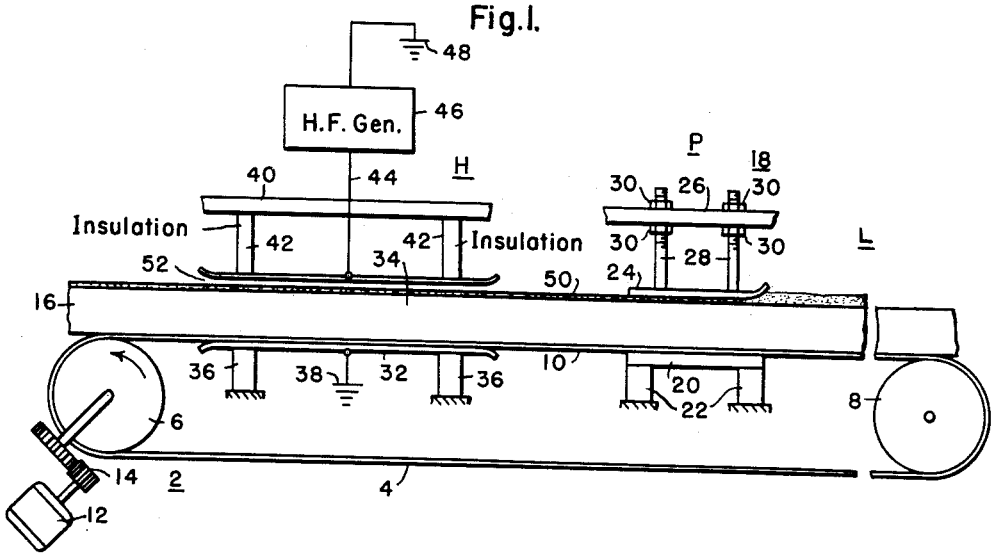

Referring to Fig. 1, a conveyor means for carrying the cereal is indicated in its entirety by the reference numeral 2 and comprises a conveyor 4 preferably of insulating material such as canvas. The conveyor is wrapped around a driving drum 6 and a return drum 8 so as to provide an upper stretch 10 between the two drums.

The driving drum 6 is driven by a motor 12 through gearing 14 in the direction of the arrow shown in Fig. 1 so that the upper conveyor-stretch 10 of the conveyor 4 moves in the substantially horizontal rectilinear path that extends from the top of the return drum 8 to the top of the driving drum 6. Each point on the conveyor-stretch 10 first passes a loading station L where cereal is dumped onto the conveyor-stretch 10. Each point then successively passes a compacting or tamping point P and a heating region H.

At the loading station L, cereal is continuously loaded onto the conveyor-stretch 10, the cereal being confined within a channel formed by the conveyor-stretch 10 and a pair of spaced vertical side belts 16 at each longitudinal side of the conveyor-stretch 10. These side belts are driven so as to move in the same direction as the conveyor-stretch 10, and preferably at the same speed, in a known manner.

At the compacting or tamping point P, a compacting device is provided which is indicated in its entirety by the reference numeral 18. This compacting means comprises a support or brace-plate 20 on which the conveyor-stretch 10 rides. This brace-plate 20 is firmly supported from a floor or other supporting means, shown as posts 22 which may be part of a table or frame, if desired. Immediately over the brace-plate 20, and preferably slightly above the top edges of the side belts 16, is a compactor-plate 24 arranged parallel to the conveyor-stretch 10 and to the brace-plate 20. This compactor-member 24 is supported from a stationary frame 26 through a plurality of rods 28, the lower ends of which have the compactor-plate 24 attached thereto. Preferably, the distance from the compactor-plate to the brace-plate 20 is adjustable and to this end the rods 28 are threaded and provided with adjusting and locking nuts 30. It is also desirable to be able to adjust the pressure which the compactor-plate 24 exerts on the mass of cereal on the underneath portion of the conveyor-stretch 10. To this end, the compactor-plate 24 may be of suitable thickness or any suitable weights may be placed on it.

At the heating station H, a pair of vertically spaced heating-electrodes 32 and 34 are provided. The heating-electrodes 32 and 34 are parallel to the conveyor-stretch 10. The lower heating-electrode 32 is preferably a solid metallic plate firmly supported in a suitable manner, as indicated at 36, and the conveyor-stretch 10 rides on it. The upper heating-electrode 34 preferably is also a metal plate. The separation between the heating-electrodes 32 and 34 is greater than that between the brace-plate 20 and compactor-plate 24. Accordingly, the upper heating-electrode 34 is farther from the conveyor-stretch 10 than the compactor-plate 24 is.

The lower heating-electrode 32 is electrically connected to ground, as indicated at 38. The two heating-electrodes 32 and 34 are relatively insulated. To this end, the upper heating-electrode 34 is carried on a stationary frame 40 by insulating rods 42. The upper heating-electrode 34 is connected by an insulated conductor 44 to an output terminal of a tube-oscillator high-frequency generator 46, the other output terminal of which is connected to the lower heating-electrode 32, either directly or through a ground connection 48.

As a matter of economy, the compactor-plate 24 is made of metal; and as a matter of precaution this compactor-plate 24 is displaced from the upper heating-electrode 34 a horizontal distance which is longer than the vertical separation-distance between the heating-electrodes 32 and 34. If desired, the compactor-member 24 may be electrically grounded, which it usually will be because the supporting structure for it is usually metal.

In the operation of the apparatus thus far described, cereal loaded at the loading station L is loaded on the conveyor-stretch 10 to a height slightly greater than the distance between the brace-member 20 and compactor-plate 24. As the conveyor-stretch 10 and side belts 16 move the cereal-load in the direction from the loading station L to the tamping point P, the cereal engages the leading curved end of the compactor-plate 24, and is packed as it continues its movement between the compactor-plate 24 and brace-plate 20. When the cereal leaves the compacting means 18, it is as a compact layer on the conveyor-stretch 10. The layer has a level top 50 and consists of cereal-grains that are firmly compacted and in contact. This level and compacted mass of cereal is then carried by the conveyor-stretch 10 and side belts 16 between the heating-electrodes 32 and 34 where it is dielectrically heated. It is to be noted that the top level 50 of the cereal-layer is spaced from the lower face of the upper heating-electrode 32 so as to provide an air gap 52 which permits the cereal to pass freely between the heating-electrodes without any frictional drag on the upper heating-electrode.

A second modification of my invention is disclosed in Fig. 2, in which a different compacting or tamping means is provided at the point P. Otherwise the embodiment may be the same as that described in connection with that of Fig. 1 so that the same parts are shown with the same reference numerals applied thereto. In Fig. 2 the compactor or tamping means is indicated in its entirety by the reference numeral 60 and comprises a compactor or tamping member 62 which is the same in construction as the plate 24 of the prior embodiment. However, it is arranged for limiting reciprocating motion. To this end, it is supported by rods 64, the upper ends of which are adapted to slide in guide-bearing holes in a stationary support plate 66. The vertical distance of the compactor or tamping member 62 from the underlying portion of the conveyor-stretch 10 can be adjusted through nuts 68.

In the space between the support plate 66 and the compactor-plate 62, a buffer plate 70 is provided which is carried by the rods 64 through positioning and locking nuts. The buffer plate 70 rests on a pair of cams 72 eccentrically mounted on a shaft 74 that is slowly rotated by a motor 76 through gearing 78. The weight of the compactor-member 62, the rods 64 and the buffer plate 70 can be sufficient to cause it to bear continuously on the cam surfaces of the cams 72. As the cams 72 rotate, they raise the buffer plate 70 and with it the rods 64 and compactor-plate 62. The weight of these parts keeps them against the surfaces of the cams so that the compactor-plate drops when the cam surfaces of lesser radius bear against the buffer plate 70, in an obvious manner. The period of reciprocation of the compactor-plate 62 should obviously be less than the time required for a point on the conveyor-stretch to pass through the tamping-means 60. Preferably, several reciprocations should be made in such time. The smallest distance between the brace-plate 20 and compactor-plate 62 is less than that between the heating-electrodes 32 and 34, with the space between the upper heating-electrode 34 and conveyor-stretch 10 greater than that between the compactor-plate 62 in its lowest position and the conveyor-stretch 10.

If desired, a spring means can be provided for adjustably pressing the compactor member 62 downwardly, and hence controlling the pressure with which the compactor-plate 62 tamps the cereal thereunder. To this end, rods 80 are dependently secured to the stationary support 66. The lower ends of the rods are above the compactor-plate 62, being spaced therefrom a distance which is greater than the maximum upward travel of the compactor-plate 62. A compression spring 82 is placed around each rod 80. The force of each spring can be adjusted by means of an adjusting nut 84 threaded on the associated rod 80.

While I have described my invention in several preferred forms, it is obviously subject to modification. The principles of the invention are also applicable in more comprehensive embodiments. For example, should the cereal level 50 tend to rise above a predetermined height, the compactor-plate 62 can be made to actuate a limit switch which in turn can operate a signal light or can be used to control the power output from the generator.

I claim as my invention:

1. Dielectric heating apparatus suitable for dielectric heating of cereals, comprising, in combination, a cereal conveyor means having a conveyor presenting a conveyor-stretch movable along a predetermined path and means for moving said conveyor-stretch in a predetermined direction from a cereal-loading station-point therealong, heating means for providing a high-frequency electric field over a portion of said path, said heating means comprising a heating-electrode substantially parallel to said conveyor-stretch at a predetermined distance thereabove, said heating-electrode being spaced from said station-point in said direction, and cereal-compacting means for compacting cereal on said conveyor-stretch before it passes into said electric field, comprising a compactor-member over another portion of said path, said compactor-member being spaced from said heating-electrode in a direction toward said loading station and having a cereal-contact surface which is substantially parallel to said heating electrode.

2. Apparatus as defined in claim 1 but further characterized by said cereal-compacting means comprising a support for said compactor-member supporting the compactor-member at a distance from said conveyor-stretch which is less than the distance of said heating-electrode from said conveyor-stretch.

3. Dielectric heating apparatus of a type described, comprising, in combination, a pair of spaced, relatively insulated heating-electrodes, a compactor-member and a brace-member spaced from each other, a conveyor-means comprising a conveyor presenting a conveyor-stretch adapted to pass first between said compactor-member and said brace-member and then between said heating-electrodes, said compactor-member comprising a plate which is spaced from the heating-electrode that is on the same side of said conveyor-stretch a distance which is greater than the spacing between said heating-electrodes.

4. Dielectric heating apparatus of a type described, comprising, in combination, a pair of spaced, relatively insulated heating-electrodes, a compactor-member and a brace-member spaced from each other, a conveyor-means comprising a conveyor presenting a conveyor-stretch adapted to pass first between said compactor-member and said brace-member and then between said heating-electrodes, said compactor-member comprising a plate which is spaced from the heating-electrode that is on the same side of said conveyor-stretch, the last said heating-electrode being insulated from ground and from said plate.

5. Dielectric heating apparatus of a type described, comprising, in combination, a pair of vertically spaced, relatively insulated heating-electrodes, a compactor-member and a brace-member spaced from each other, a conveyor-means comprising a conveyor presenting a conveyor-stretch adapted to ride first on said brace-member, and then on a lower one of said heating-electrodes, said compactor-member comprising a plate above said brace-member, the spacing between said compactor-member and said brace-member being less than that between said heating-electrodes, and means for reciprocating said compactor-member.

6. Dielectric heating apparatus of a type described, comprising, in combination, a pair of vertically spaced relatively insulated upper and lower heating-electrodes, an upper compactor-member and a lower brace-member spaced from each other, a conveyor-means comprising a conveyor presenting a substantially horizontal conveyor-stretch adapted to pass first between said compactor-member and said brace-member and then between said heating-electrodes, said compactor-member comprising a flat surface toward said conveyor-stretch, the spacing between said surface and said conveyor-stretch being less than that between said upper heating-electrode and said conveyor-stretch.

7. Dielectric heating apparatus of a type described, comprising, in combination, a pair of vertically spaced relatively insulated upper and lower heating-electrodes, an upper compactor-member and a lower brace-member spaced from each other, a conveyor-means comprising a conveyor presenting a substantially horizontal conveyor-stretch adapted to pass first between said compactor-member and said brace-member and then between said heating-electrodes, said compactor-member comprising a flat surface towards said conveyor-stretch, the spacing between said surface and said conveyor-stretch being less than that between said upper heating-electrode and said conveyor-stretch, and means for reciprocating said compactor-member.

8. Dielectric heating apparatus suitable for dielectric heating of cereals, comprising, in combination, a cereal-conveyor means having a conveyor presenting a conveyor-stretch movable along a predetermined path and means for moving said conveyor-stretch in a predetermined direction from a cereal-loading station-point therealong, heating means for providing a high-frequency electric field over a first portion of said path, said heating means comprising a heating-electrode substantially parallel to said conveyor-stretch at a predetermined distance thereabove, said heating-electrode being spaced from said station point in said direction, and cereal compactor-means comprising a compactor-plate and a brace-plate on opposite sides of said conveyor-stretch, said compactor-plate being spaced from said heating-electrode in a direction toward said loading point, the spacing between said compactor-plate and said heating-electrode being greater than the spacing of said heating-electrode from said conveyor-stretch.

9. Apparatus as defined in claim 8 but further characterized by means for reciprocating said compactor-plate.

References Cited in the file of this patent

UNITED STATES PATENTS

| Number | Name | Date |
|---|---|---|
| 1,231,883 | Hanssen | July 3, 1917 |
| 1,965,609 | Smith | July 10, 1934 |
| 2,007,874 | Redler | July 9, 1935 |
| 2,064,522 | Davis | Dec. 15, 1936 |
| 2,195,683 | Ross et al. | Apr. 2, 1940 |
| 2,223,813 | Brown | Dec. 3, 1940 |
| 2,509,354 | Jones et al. | May 30, 1950 |

FOREIGN PATENTS

| Number | Country | Date |
|---|---|---|
| 29,353 | Sweden | Sept. 19, 1907 |
| 517,798 | Great Britain | Feb. 8, 1940 |
| 621,096 | Great Britain | Apr. 4, 1949 |